United States Patent
Lorpitthaya et al.

(10) Patent No.: US 8,518,135 B1
(45) Date of Patent: Aug. 27, 2013

(54) POLISHING COMPOSITION CONTAINING HYBRID ABRASIVE FOR NICKEL-PHOSPHOROUS COATED MEMORY DISKS

(75) Inventors: Rujee Lorpitthaya, Singapore (SG); Selvaraj Palanisamy Chinnathambi, Taman Jurong (SG); Haresh Siriwardane, Woodlands (SG)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 13/594,947

(22) Filed: Aug. 27, 2012

(51) Int. Cl.
*B24D 3/02* (2006.01)
*C09C 1/68* (2006.01)
*C09K 3/14* (2006.01)

(52) U.S. Cl.
USPC ............... 51/307; 51/308; 51/309; 438/689; 438/690; 438/691; 438/692; 438/693

(58) Field of Classification Search
None
See application file for complete search history.

(56) References Cited

U.S. PATENT DOCUMENTS

| | | | |
|---|---|---|---|
| 5,527,423 A * | 6/1996 | Neville et al. | 438/693 |
| 5,693,239 A | 12/1997 | Wang et al. | |
| 6,193,790 B1 * | 2/2001 | Tani | 106/3 |
| 6,355,565 B2 * | 3/2002 | Feeney et al. | 438/691 |
| 6,896,591 B2 | 5/2005 | Chaneyalew et al. | |

* cited by examiner

*Primary Examiner* — Duy Deo
(74) *Attorney, Agent, or Firm* — Thomas E Omholt; Francis J Koszyk; Steven D Weseman

(57) ABSTRACT

The invention provides a polishing composition that contains (a) an abrasive comprising (i) first alpha alumina particles that have an average aspect ratio of 0.8:1 to 1.2:1, (ii) second alpha alumina that have an average aspect ratio of greater than 1.2:1, (iii) fumed alumina particles, and (iv) wet-process silica particles, and (b) water. The invention also provides a method of polishing a substrate, especially a nickel-phosphorous substrate, with the polishing composition.

22 Claims, 1 Drawing Sheet

POLISHING COMPOSITION CONTAINING HYBRID ABRASIVE FOR NICKEL-PHOSPHOROUS COATED MEMORY DISKS

BACKGROUND OF THE INVENTION

The demand for increased storage capacity in memory or rigid disks and the trend towards miniaturization of memory or rigid disks (e.g., due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

The term "memory or rigid disk" refers to any magnetic disk, hard disk, rigid disk, or memory disk for retaining information in electromagnetic form. The memory or rigid disk typically has a surface that comprises nickel-phosphorous, but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

Surface characteristics of memory or rigid disks affecting the flying height of the magnetic head include waviness and microwaviness. Waviness or warp is a gross deviation from flatness over the entire disk surface. An intermediate form of surface deviation, herein referred to as microwaviness, may exist. Mircowaviness is a waviness of a disk surface for a range of wavelengths that are on the order of the length of the transducing head. Using current technology, these wavelengths are approximately in the range of 10 to 5000 microns. For low flying head heights, microwaviness can create an airbearing resonance, thereby causing excessive head to disk spacing modulation. The spacing modulation resulting from microwaviness can cause poor overwriting of data on the disk surface, and in some cases can even cause collision of the head with the disk surface with resulting damage to the disk surface and/or the recording head.

During the polishing of a memory or rigid disk, typically the edges of the disk receive a higher pressure from the polishing tool than the remaining surface of the disk, which leads to the formation of a curved, or rounded, contour at the edges of the disk. The rounded edge areas are known in the art as edge roll-off, rub-off or dub-off. Such rounded areas on a disk are unsuitable for recording.

Generally, polishing compositions for memory or rigid disks comprise abrasives to increase the removal rates of the substrate. High removal rates also are achieved by an increase in downward force of the polishing pad to the substrate. However, an increase in the downward force leads to abrasive particles becoming embedded into the substrate surface, a result, which negatively impacts microwaviness and surface roughness.

There remains a need in the art for a polishing composition and method for planarizing or polishing memory or rigid disks which minimize embedded abrasives, microwaviness and edge roll-off, without sacrificing the removal rate of the substrate.

BRIEF SUMMARY OF THE INVENTION

The invention provides a polishing composition comprising (a) an abrasive comprising (i) first alpha alumina particles that have an average aspect ratio of 0.8:1 to 1.2:1, second alpha alumina particles that have an average aspect ratio of greater than 1.2:1, (iii) fumed alumina particles, and (iv) wet-process silica particles, and (b) water.

The invention provides a method of polishing a substrate, which method comprises (i) providing a substrate, especially a substrate comprising at least one layer of nickel-phosphorous, (ii) providing a polishing pad, (iii) providing a polishing composition of the invention, (iv) contacting a surface of the substrate with the polishing pad and the polishing composition, and (v) abrading at least a portion of the surface of the substrate to remove at least some portion of the substrate, especially at least some portion of nickel-phosphorous, from the surface of the substrate and to polish the surface of the substrate.

DETAILED DESCRIPTION OF THE INVENTION

The invention provides a polishing composition comprising, consisting essentially of, or consisting of an abrasive and water. The abrasive comprises, consists essentially of, or consists of (i) first alpha alumina particles that have an average aspect ratio of 0.8:1 to 1.2:1, (ii) second alpha alumina particles that have an average aspect ratio of greater than 1.2:1, (iii) fumed alumina particles, and (iv) wet-process silica particles.

Alpha alumina particles refer to alumina particles comprising about 50 wt. % or more of the alpha polymorph of alumina, which polymorph typically is formed at high temperatures, e.g., above 1400° C.

The polishing composition comprises first alpha alumina particles that have an average aspect ratio of 0.8:1 to 1.2:1. The term aspect ratio is generally known in the art of abrasive particles and refers to the ratio of length to width, or length to cross-section (e.g., diameter), or the largest cross-sectional dimension to the smallest cross-sectional dimension when irregular particles are at issue.

The aspect ratio of the first and second alpha alumina particles can be determined readily by those of skill in the art, for example, using optical microscopy optionally aided by image analysis software such as, for example, IMAGE-PRO PLUS image analysis software marketed by Media Cybernetic LP of Silver Spring, Md. For example, two-dimensional silhouettes of a representative sample of a quantity of abrasive particles can be used with image analysis to characterize the aspect ratio of the abrasive particles.

Figure 1:
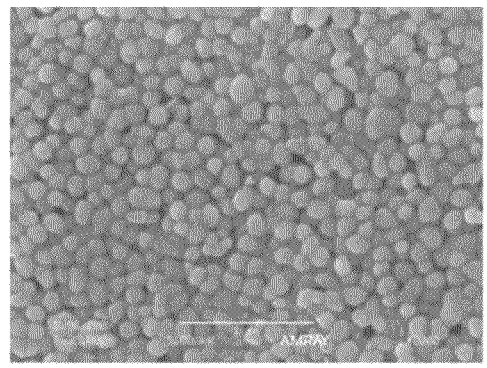
FIG. 1 is a scanning electron microscope (SEM) image of alpha alumina particles that have an average aspect ratio of 0.8:1 to 1.2:1.
Figure 2:
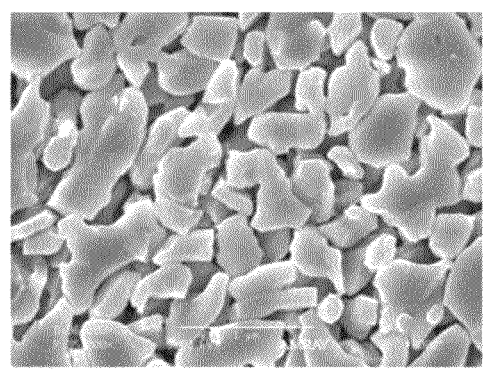
FIG. 2 is an SEM image of alpha alumina particles that have an average aspect ratio of greater than 1.2:1.

FIGS. 1 and 2 depict the difference in physical appearance between alpha alumina particles having different aspect ratios. Specifically, FIG. 1 is a scanning electron microscope (SEM) image of alpha alumina particles having an average aspect ratio of 0.8:1 to 1.2:1. FIG. 2 is an SEM image of alpha alumina having an average aspect ratio of greater than 1.2:1.

The first alpha alumina particles can have an average aspect ratio 0.8:1 or more, 0.9:1 or more, 1:1 or more, 1.05:1 or more, or 1.1:1 or more. Alternatively, or in addition to, the first alpha alumina particles can have an average aspect ratio of 1.2:1 or less, 1.1:1 or less, or 1:1 or less. Thus, the first alpha alumina particles can have an average aspect ratio bounded by any two of the aforementioned endpoints. For example, the first alpha alumina particles can have an average aspect ratio of 0.8:1 to 1.1:1, 0.9:1 to 1:1, or 1.05:1 to 1:1.

The first alpha alumina particles can have any suitable particle size. The particle size of an approximately spherical particle is the diameter of the particle. The particle size of any non-spherical particle is the diameter of the smallest sphere that encompasses the particle. The first alpha alumina particles can have an average particle size (e.g., average particle diameter) of 50 nm or more, 100 nm or more, 200 nm or more, 300 nm or more, 400 nm or more, or 450 nm or more. Alternatively, or in addition, the first alpha alumina particles can have an average particle size of 800 nm or less, 700 nm or less, 600 nm or less, 500 nm or less, or 450 nm or less. Thus, the first alpha alumina particles can have an average particle size bounded by any two of the aforementioned endpoints. For example, the first alpha alumina particles can have an average particle size of 50-500 nm, 200-500 nm, 300-600 nm, 300-700 nm, 450-600 nm, or 400-700 nm.

The polishing composition can comprise any suitable amount of the first alpha alumina particles. The polishing composition can contain 0.01 wt. % or more, 0.05 wt. % or more, 0.1 wt. % or more, or 0.3 wt. % or more of the first alpha alumina particles. Alternatively, or in addition, the polishing composition can contain 5 wt. % or less, 3 wt. % or less, 1 wt. % or less, 0.8 wt. % or less, or 0.5 wt. % or less of the first alpha alumina particles. Thus, the polishing composition can contain the first alpha alumina particles in an amount bounded by any two of the aforementioned endpoints. For example the polishing composition can contain 0.01-5 wt. %, 0.1-3 wt. %, 0.3-0.8 wt. %, or 0.1-0.8 wt. % of the first alpha alumina particles.

The polishing composition comprises second alpha alumina particles that have an average aspect ratio of greater than 1.2:1. The second alpha alumina particles can have an average aspect ratio 1:2 or more, 1.3:1 or more, 1.5:1 or more, 2:1 or more, or 2.5:1 or more. Alternatively, or in addition to, the second alpha alumina particles can have an average aspect ratio of 5:1 or less, 4:1 or less, or 3:1 or less. Thus, the second alpha alumina particles can have an average aspect ratio bounded by any two of the aforementioned endpoints. For example, the second alpha alumina particles can have an average aspect ratio of 1.3:1 to 5:1, 1.3:1 to 5:1, or 2:1 to 4:1.

The second alpha alumina particles can have any suitable particle size. The second alpha alumina particles can have an average particle size (e.g., average particle diameter) of 20 nm or more, 30 nm or more, 40 nm or more, 50 nm or more, or 75 nm or more. Alternatively, or in addition, the second alpha alumina particles can have an average particle size of 500 nm or less, 400 nm or less, 300 nm or less, 250 nm or less, or 200 nm or less. Thus, the second alpha alumina particles can have an average particle size bounded by any two of the aforementioned endpoints. For example, the second alpha alumina particles can have an average particle size of 20-500 nm, 30-500 nm, 30-400 nm, 50-300 nm, 50-250 nm, 75-250 nm, or 75-200 nm.

The polishing composition can comprise any suitable amount of the second alpha alumina particles. The polishing composition can contain 0.01 wt. % or more, 0.05 wt. % or more, 0.1 wt. % or more, or 0.3 wt. % or more of the second alpha alumina particles. Alternatively, or in addition, the polishing composition can contain 5 wt. % or less, 3 wt. % or less, 1 wt. % or less, 0.8 wt. % or less, or 0.5 wt. % or less of the second alpha alumina particles. Thus, the polishing composition can contain the second alpha alumina particles in an amount bounded by any two of the aforementioned endpoints. For example the polishing composition can contain 0.01-5 wt. %, 0.1-3 wt. %, 0.3-0.8 wt. %, or 0.1-0.8 wt. % of the second alpha alumina particles.

The abrasive can contain a weight ratio of the first alpha alumina particles to the second alpha alumina particles of 0.1:1 or more, 0.3:1 or more, 0.5:1 or more, or 0.7:1 or more. Alternatively, or in addition to, the weight ratio of the first alpha alumina particles to the second alpha alumina particles can be 1.3:1 or less, 1.1:1 or less, 1:1 or less, 0.9:1 or less, or 0.8:1 or less. Thus the weight ratio of the first alpha alumina particles to the second alpha alumina particles can be bounded by any two of the aforementioned endpoints. For example, the weight ratio of the first alpha alumina particles to the second alpha alumina particles can be 0.1:1 to 1:1, 0.3:1 to 1:1, 0.5:1 to 1:1, 0.5:1 to 1.1:1, or 0.7:1 to 0.9:1.

The polishing composition comprises fumed alumina particles. Fumed alumina is an amorphous form of aluminum oxide. Fumed alumina has an aggregate structure in which approximately spherical primary particles are associated into chain-like aggregates of primary particles. The primary particles are bonded together by covalent bonds and electrostatic interactions and typically are resistant to degradation by, e.g., mechanical energy inputs such as high-shear mixing. Multiple fumed alumina aggregates can be more loosely associated in the form of agglomerates. Agglomerates are more easily broken up into their component aggregates. The particles size of the fumed alumina refers to the diameter of the smallest sphere that encloses the aggregate of primary particles (rather than individual primary particles or the agglomerates of multiple aggregates).

The fumed alumina particles can have any suitable average particle size (i.e., average particle diameter). The fumed alumina particles can have an average particle size 30 nm or more, 40 nm or more, 50 nm or more, 70 nm or more, or 100 nm or more. Alternatively, or in addition, the fumed alumina particles can have an average particle size of 250 nm or less, 230 nm or less, 210 nm or less, 190 nm or less, or 150 nm or less. Thus, the fumed alumina particles can have an average particle size bounded by any two of the aforementioned endpoints. For example, the fumed alumina particles can have an average particle size of 30-250 nm, 30-230 nm, 50-190 nm, 70-150 nm, or 100-150 nm.

The polishing composition can comprise any suitable amount of the fumed alumina particles. The polishing composition can contain 0.01 wt. % or more, 0.05 wt. % or more, 0.1 wt. % or more, or 0.3 wt. % or more of the fumed alumina particles. Alternatively, or in addition, the polishing composition can contain 5 wt. % or less, 3 wt. % or less, 1 wt. % or less, 0.8 wt. % or less, or 0.5 wt. % or less of the fumed alumina particles. Thus, the polishing composition can contain the fumed alumina particles in an amount bounded by any two of the aforementioned endpoints recited for the filmed alumina particles. For example the polishing composition can contain 0.01-5 wt. %, 0.1-3 wt. %, 0.3-0.8 wt. %, or 0.1-0.8 wt. % of the fumed alumina particles.

The polishing composition comprises wet-process silica particles (e.g., condensation-polymerized or precipitated silica particles). Condensation-polymerized silica particles typically are prepared by condensing $Si(OH)_4$ to form colloidal particles, where colloidal particles are defined as having an average particle size between about 1 nm and about 1000 nm. Such wet-process silica particles can be prepared in accordance with U.S. Pat. No. 5,230,833 or can be obtained as any of various commercially available products, such as the Akzo-Nobel Bindzil 50/80 product, the Nalco DVSTS006 product, and the Fuso PL-2 product, as well as other similar products available from DuPont, Bayer, Applied Research, Nissan Chemical, and Clariant.

The wet-process silica particles can have any suitable average particle size (i.e., average particle diameter). The wet-process silica particles can have an average particle size of 4 nm or more, 10 nm or more, 15 nm or more, 20 nm or more, or 25 nm or more. Alternatively, or in addition, the wet-process silica particles can have an average particle size of 180 nm or less, 120 nm or less, 110 nm or less, 100 nm or less, 90 nm or less, 80 nm or less, 70 nm or less, 60 nm or less, 50 nm or less, or 40 nm or less. Thus, the wet-process silica particles can have an average particle size bounded by any two of the aforementioned endpoints. For example, the wet-process silica particles can have an average particle size of 10-100 nm, 20-100 nm, 20-80 nm, 20-60 nm, or 20-40 nm.

The polishing composition can contain any suitable amount of wet-process silica. The polishing composition can contain 0.5 wt. % or more, 1 wt. % or more, 2 wt. % or more, or 5 wt. % or more of wet-process silica particles. Alternatively, or in addition, the polishing composition can contain 25 wt. % or less, 20 wt. % or less, 15 wt. % or less, 10 wt. % or less, 8 wt. % or less, 6 wt. % or less, or 5 wt. % or less of wet-process silica particles. Thus, the polishing composition can contain wet-process silica particles in an amount bounded by any two of the aforementioned endpoints. For example the polishing composition can contain 0.5-20 wt. %, 1-15 wt. %, 5-15 wt. %, or 0.5-5 wt. % of wet-process silica particles.

The abrasive can contain any suitable amount of the first alpha alumina particles, second alpha alumina particles, fumed alumina particles, and wet-processed silica. For example, the abrasive can contain 1-10 wt. % of first alpha alumina particles, 10-60 wt. % of second alpha alumina particles, 5-20 wt. % of fumed alumina particles, and 20-60 wt. % of wet-processed silica, based on the total weight of the abrasive in the polishing composition.

The polishing composition preferably does not contain any other forms of alumina, i.e., alumina particles other than the first and second alpha alumina particles and the fumed alumina particles described herein. Similarly, the polishing composition preferably does not contain any other forms of silica, i.e., silica particles other than the wet-process silica particles described herein. Furthermore, the polishing composition preferably does not contain any abrasive other than the alumina and silica particles described herein, i.e., abrasive particles other than the first and second alpha alumina particles, fumed alumina particles, and wet-process silica particles described herein.

Preferably, the abrasive is colloidally stable within the polishing composition. The term colloid refers to the suspension of particles in the liquid carrier (e.g., water). Colloidal stability refers to the maintenance of that suspension through time. In the context of this invention, the abrasive is considered colloidally stable if, when the abrasive is placed into a 100 mL graduated cylinder and allowed to stand unagitated for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the initial concentration of particles in the abrasive composition ([C] in terms of g/mL) is less than or equal to 0.5 (i.e., $\{[B]-[T]\}/[C] \leq 0.5$). More preferably, the value of $[B]-[T]/[C]$ is less than or equal to 0.3, and most preferably is less than or equal to 0.1.

The polishing composition can contain any suitable amount of the abrasive. The polishing composition can contain 0.5 wt. % or more, 1 wt. % or more, 2 wt. % or more, or 5 wt. % or more of abrasive. Alternatively, or in addition, the polishing composition can contain 25 wt. % or less, 20 wt. % or less, 15 wt. % or less, 10 wt. % or less, 8 wt. % or less, 6 wt. % or less, or 5 wt. % or less of abrasive. Thus, the polishing composition can contain the abrasive in an amount bounded by any two of the aforementioned endpoints. For example the polishing composition can contain 0.5-20 wt. %, 1-15 wt. %, 5-15 wt. %, or 0.5-5 wt. % of abrasive.

The polishing composition comprises water. The water is used to facilitate the application of the abrasive particles to the surface of a suitable substrate to be polished or planarized. Preferably, the water is deionized water.

The polishing composition can have any suitable pH. The polishing composition desirably has an acidic pH, i.e., a pH of less than 7. Preferably, the polishing composition has a pH of 6 or less (e.g., 5 or less). Even more preferably, the polishing composition has a pH of 1 to 4 (e.g., 2 to 4). The polishing composition optionally contains pH adjusting agents, for example, potassium hydroxide, ammonium hydroxide, and/or nitric acid. The polishing composition also optionally comprises ph buffering systems. Many such pH buffering systems are well known in the art. The pH buffering agent can be any suitable buffering agent, for example, bicarbonate-carbonate buffer systems, aminoalkylsulfonic acids, and the like. The polishing composition can comprise any suitable amount of a pH adjustor and/or a pH buffering agent, provided that a suitable amount is used to achieve and/or maintain the pH of the polishing composition within a suitable range.

The polishing composition optionally further comprises at least one oxidizing agent. The function of the oxidizing agent is to oxidize at least a part of a substrate, such as a layer or layers comprising, for example, nickel-phosphorous. The oxidizing agent can be any suitable oxidizing agent. Non-limiting examples of suitable oxidizing agents include hydrogen peroxide, persulfate salts (e.g., ammonium persulfate), ferric salts (e.g., ferric nitrate), solid forms of hydrogen peroxide, and combinations thereof. Solid forms of hydrogen peroxide include sodium percarbonate, calcium peroxide, and magnesium peroxide, which liberate free hydrogen peroxide when dissolved in water. Preferably, the oxidizing agent is hydrogen peroxide.

The polishing composition can contain any suitable amount of the oxidizing agent. The polishing composition can contain 0.01 wt. % or more, 0.5 wt. % or more, 0.1 wt. % or more, 1 wt. % or more, or 1.5 wt. % or more of the oxidizing agent. Alternatively, or in addition, the polishing composition can contain 10 wt. % or less, 5 wt. % or less, 3 wt. % or less, 2 wt. % or less, or 1.5 wt. % or less of the oxidizing agent. Thus, the polishing composition can contain the oxidizing agent in an amount bounded by any two of the aforementioned endpoints. For example, the polishing composition can contain in an amount of 0.01-10 wt. %, 0.5-5 wt. %, 0.1-3 wt. %, 1.5-3 wt. %, or 1.5-2 wt. % of the oxidizing agent.

The polishing composition optionally further comprises at least one chelating agent for nickel. The chelating agent can be any suitable chelating agent for nickel. Non-limiting examples of suitable chelating agents include amino acids (for example, glycine) and organic carboxylic acids (for example nicotinic acid and tartaric acid).

The polishing composition can contain any suitable amount of the chelating agent. The polishing composition can contain 0.01 wt. % or more, 0.5 wt. % or more, 0.1 wt. % or more, 1 wt % or more, or 1.5 wt. % or more of the chelating agent. Alternatively, or in addition, the polishing composition can contain 10 wt. % or less, 5 wt. % or less, 3 wt. % or less, 2 wt. % or less, or 1.5 wt. % or less of the chelating agent. Thus, the polishing composition can contain the chelating agent in an amount bounded by any two of the aforementioned endpoints. For example, the polishing composition can contain in an amount of 0.01-10 wt. %, 0.5-5 wt. %, 0.1-3 wt. %, 1.5-3 wt. %, or 1.5-2 wt. % of the chelating agent.

The polishing composition optionally further comprises at least one nonionic surfactant. The nonionic surfactant can be any suitable nonionic surfactant. Suitable nonionic surfactants include copolymer surfactants comprising siloxane units, ethylene oxide units, and/or propylene oxide units which can have a linear, pendant, or trisiloxane structure. Non-limiting examples of suitable nonionic surfactants include alkylphenol ethoxylates (e.g., nonylphenol ethoxylates), alcohol ethoxylates, siloxane ethoxylates, and the like. Preferably, the nonionic surfactant includes nonylphenol ethoxylates such as the Tergitol NP series available from Dow Corning (Midland, Mich.) and siloxane ethoxylates such as the Silwet series available from General Electric (Schenectady, N.Y.).

The polishing composition can contain any suitable amount of the nonionic surfactant. The polishing composition can contain 0.01 wt. % or more, 0.5 wt. % or more, 0.1 wt. % or more, 1 wt. % or more, or 1.5 wt. % or more of the nonionic surfactant. Alternatively, or in addition, the polishing composition can contain 10 wt. % or less, 5 wt. % or less, 3 wt. % or less, 2 wt. % or less, or 1.5 wt. % or less of the nonionic surfactant. Thus, the polishing composition can contain the nonionic surfactant in an amount bounded by any two of the aforementioned endpoints. For example, the polishing composition can contain in an amount of 0.01-10 wt. %, 0.5-5 wt. %, 0.1-3 wt. %, 1.5-3 wt. %, or 1.5-2 wt. % of the nonionic surfactant.

The polishing composition optionally further comprises one or more other additives. Such additives include surfactants and/or rheological control agents, antifoaming agents, and biocides. Additives can be present in the polishing composition at any suitable concentrations. Such additives can include any suitable dispersing agent, such as, for example, homopolymers or random, block, or gradient acrylate copolymers comprising one or more acrylic monomers (e.g., polyacrylates, polymethacrylates, vinyl acrylates and styrene acrylates), combinations thereof, and salts thereof. The biocide can be any suitable biocide, for example, an isothiazolinone biocide.

The polishing composition of the invention can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., first alpha alumina particles, fumed alumina particles, abrasive, water, etc.) as well as any combination of ingredients (e.g., abrasive, water, oxidizing agent, chelating agent, etc.).

For example, the abrasive can be dispersed in water. The oxidizing agent, chelating agent, and nonionic surfactant can then be added, and mixed by any method that is capable of incorporating the components into the polishing composition. Other compounds that increase the removal rate of one or more of the materials being removed to effect polishing of the substrate similarly can be utilized in the preparation of the polishing composition. The polishing composition can be prepared prior to use, with one or more components, such as a pH adjusting component, added to the polishing composition just before use (e.g., within about 7 days before use, or within about 1 hour before use, or within about 1 minute before use). The polishing composition also can be prepared by mixing the components at the surface of the substrate during the polishing operation.

The polishing composition also can be provided as a concentrate which is intended to be diluted with an appropriate amount of water prior to use. In such case, the polishing composition concentrate can comprise, for example, abrasive and water in amounts such that, upon dilution of the concentrate with an appropriate amount of water, each component of the polishing composition will be present in the polishing composition in an amount within the appropriate range recited above for each component. Furthermore, as will be understood by those of ordinary skill in the art, the concentrate can contain an appropriate fraction of the water present in the final polishing composition in order to ensure that the components and other suitable additives are at least partially or fully dissolved in the concentrate.

The invention provides a method of polishing a substrate, which method comprises (i) providing a substrate, such as a substrate comprising at least one layer of nickel-phosphorous, (ii) providing a polishing pad, (iii) providing a polishing composition as described herein, (iv) contacting a surface of the substrate with the polishing pad and the polishing composition, and (v) abrading at least a portion of the surface of the substrate to remove at least some portion of the surface of the substrate, such as to remove at least some nickel-phosphorous from the surface of the substrate, and to polish the surface of the substrate.

The polishing method of the invention is particularly suited for use in conjunction with a chemical-mechanical polishing apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving the substrate relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be polished with the polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. Hard polyurethane polishing pads are particularly useful in conjunction with the inventive polishing method.

Desirably, the chemical-mechanical polishing apparatus further comprises an in situ polishing endpoint detection system, many of which are known in the art. Techniques for inspecting and monitoring the polishing process by analyzing light or other radiation reflected from a surface of the substrate being polished are known in the art. Such methods are described, for example, in U.S. Pat. No. 5,196,353, U.S. Pat. No. 5,433,65 U.S. Pat. No. 5,609,511, U.S. Pat. No. 5,643,046, U.S. Pat. No. 5,658,183, U.S. Pat. No. 5,730,642, U.S.

Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a substrate being polished enables the determination of the polishing endpoint, i.e., the determination of when to terminate the polishing process with respect to a particular substrate.

EXAMPLES

The following examples further illustrate the invention but, of course, should not be construed as in any way limiting its scope.

The polishing experiments reflected in the examples involved the use of a commercially available polishing apparatus with 9.51 kPa (1.38 psi) downforce pressure of the substrate against an CR200 polishing pad (available from Ceiba Technologies) unless indicated otherwise, 20-30 rpm platen speed, and 25-30 rpm carrier speed.

Optical Surface Analyzer (OSA) alumina counts were measured after a P2 KISS buffer step for 60 seconds by an OSA Candela 6100 (available from KLA Tencor) using two independent laser wave lengths (405 nm and 660 nm) set at oblique and normal incident angles. The OSA alumina counts are an indirect measurement of the amount of embedded alumina particles.

A roughness measurement of the disc surface was determined by a Texture Measurement System (TMS), which incorporates a scatterometer equipped with a class II lazer having a wavelength of 670 nm.

Microwaviness, short microwaviness, and low frequency roughness (LF-Ra) measurements of the surface of the substrate were measured using a Zygo interferometer at wavelengths of 200-1450 μm, 80-500 μm, and 20-200 μm, respectively.

Example 1

A polishing composition was prepared with 0.7 wt. % second alpha alumina particles having an average aspect ratio of 2-2.7:1, 0.18 wt. % of fumed alumina particles, 2.63 wt. % of colloidal silica particles having an average surface area of 80 m²/g, 0.8 wt. % hydrogen peroxide, and 0.0108 wt. % organo siloxane, with the remainder water. The second alpha alumina particles had an average particle size of 350 nm. The polishing composition was used to polish nickel-phosphorous (Ni—P) substrates under different polishing conditions. The polishing parameters include a 12 second ramp down time and a downward force and water rinse time as indicated in Table 1.

The removal rate (RR) of the nickel-phosphorous substrate was determined for each set of polishing conditions and set forth in Table 1. In addition, the resulting nickel-phosphorous substrates were evaluated for embedded alumina particles (OSA count), microwaviness, and roughness (TMS Ra), with the results set forth in Table 1.

TABLE 1

| Downward Force (kPa) | Water Rinse Time (s) | OSA Count | Ni-P RR (mg/mm) | Microwaviness (Å) | TMS Ra (Å) |
| --- | --- | --- | --- | --- | --- |
| 7.24 | 30 | 847 | 37.88 | 3.15 | 5.68 |
| 9.51 | 30 | 1187 | 41.48 | 3.20 | 5.69 |
| 11.72 | 30 | 2474 | 42.81 | 3.07 | 5.69 |
| 9.51 | 12 | 1711 | 40.27 | 3.76 | 6.23 |
| 9.51 | 60 | 939 | 43.41 | 3.22 | 5.42 |

As apparent from the data set forth in Table 1, the removal rate increases as a function of downward force. For example, as the downward force increased from 7.24 kPa to 9.51 kPa to 11.72 kPa under otherwise similar conditions, the substrate removal rate increased from 37.88 Å/min to to 41.48 Å/min to 42.81 Å/min. However, as the downward force increased from 7.24 kPa to 9.51 kPa to 11.72 kPa under otherwise similar conditions, the number of embedded alumina particles in the substrate undesirably increased front 847 to 1187 to 2474. When the downward force was kept constant at 9.51 kPa, and the water rinse time was increased from 12 s to 30 s to 60 s, the substrate removal rate increased, and the number of embedded alumina particles in the substrate decreased, along with the microwaviness and roughness of the substrate surface.

Example 2

Polishing Compositions 2A-2H were prepared with first alpha alumina particles having an average aspect ratio of 1-1.1:1, second alpha alumina particles having an average aspect ratio of 2-2.7:1, and wet-process silica particles in the amounts indicated in Table 2. In addition, Polishing Compositions 2A-2H comprise 0.18 wt. % fumed alumina particles having an average particle size of 130 nm, 0.8 wt. % tartaric acid, 0.6 wt. % hydrogen peroxide, and 0.0108 wt. % organo siloxane.

The polishing compositions were used to polish nickel-phosphorous substrates under similar conditions. The resulting nickel-phosphorous substrates were evaluated for embedded alumina particles (OSA count) both post-polishing and post-buffing and are set forth in Table 2.

TABLE 2

| Polishing Composition | First Alpha Alumina Particles (wt. %) | First Alpha Alumina Average Particle Size (nm) | Second Alpha Alumina Particles (wt. %) | Second Alpha Alumina Average Particle Size (nm) | SiO₂ Particles (wt. %) | Post-Polishing Defect Count | Post-Buffing Defect Count |
| --- | --- | --- | --- | --- | --- | --- | --- |
| 2A | 0 | 200 | 0.7 | 350 | 0 | 470 | 464 |
| 2B | 0.5 | 200 | 0.7 | 350 | 0 | 387 | 439 |
| 2C | 0 | 200 | 0.7 | 350 | 2 | 313 | 386 |
| 2D | 0.5 | 200 | 0.7 | 350 | 2 | 87 | 368 |
| 2E | 0 | 200 | 0.7 | 500 | 0 | 400 | 413 |

TABLE 2-continued

| Polishing Composition | First Alpha Alumina Particles (wt. %) | First Alpha Alumina Average Particle Size (nm) | Second Alpha Alumina Particles (wt. %) | Second Alpha Alumina Average Particle Size (nm) | $SiO_2$ Particles (wt. %) | Post-Polishing Defect Count | Post-Buffing Defect Count |
|---|---|---|---|---|---|---|---|
| 2F | 0.5 | 200 | 0.7 | 500 | 0 | 220 | 361 |
| 2G | 0 | 200 | 0.7 | 500 | 2 | 384 | 542 |
| 2H | 0.5 | 200 | 0.7 | 500 | 2 | 319 | 444 |

Polishing Compositions 2A-2D are similar to Polishing Compositions 2E-2H, respectively, except that Polishing Compositions 2A-2D utilize second alpha alumina particles with an average particle size of 350 nm, whereas Polishing Compositions 2E-2H utilize second alpha alumina particles with an average particle size of 500 nm. Within each group of Polishing Compositions 2A-2D and Polishing Compositions 2E-2H, one polishing composition only utilizes second alpha alumina particles and fumed alumina particles as the abrasive (Polishing Compositions 2A and 2E), one polishing composition only utilizes first and second alpha alumina particles and fumed alumina particles as the abrasive (Polishing Compositions 2B and 2F), one polishing composition only utilizes second alpha alumina particles, fumed alumina particles, and wet-process silica particles as the abrasive (Polishing Compositions 2C and 2G), and one polishing composition utilizes first and second alpha alumina particles, fumed alumina particles, and wet-process silica particles as the abrasive (Polishing Compositions 2D and 2H).

As apparent from the data set forth in Table 2, when the abrasive fails to include first alpha alumina particles, the post-polishing and post-buffering substrate defect counts are higher than when the abrasive comprises both first alpha alumina particles and second alpha alumina particles in addition to fumed alumina particles (compare Polishing Compositions 2A and 2B, Polishing Compositions 2C and 2D, Polishing Compositions 2E and 2F, and Polishing Compositions 2G and 2H). In addition, when the abrasive fails to include wet-process silica particles, the post-polishing and post-buffering substrate defect counts are higher than when the abrasive comprises wet-process silica particles in addition to second alpha alumina particles and fumed alumina particles, at least when the second alpha alumina particles have an average particle size of 350 nm (compare Polishing Compositions 2A and 2C, as well as Polishing Compositions 2B and 2D).

Example 3

Polishing Compositions 3A-3H were prepared with first alpha alumina particles having an average aspect ratio of 1-1.1:1, a second alpha alumina particles having an average aspect ratio of 2-2.7:1, and wet-process silica in amounts indicated in Table 3A. In addition, Polishing Compositions 3A-3H comprise 0.18 wt. % fumed alumina particles having an average particle size of 130 nm, 1 wt. % tartaric acid, 0.6 wt. % hydrogen peroxide, and 0.0108 wt. % organo siloxane.

The polishing compositions were used to polish nickel-phosphorous substrates under similar conditions. The removal rate (RR) of the nickel-phosphorous substrate was determined for each polishing composition and set forth in Table 3B. In addition, the resulting nickel-phosphorous substrates were evaluated for microwaviness, short microwaviness, low frequency roughness, and roll off, with the results set forth in Table 3B.

TABLE 3A

| Polishing Composition | Firm Alpha Alumina Particles (wt. %) | First Alpha Alumina Average Particle Size(nm) | Second Alpha Alumina Particles (wt. %) | Second Alpha Alumina Average Particles Size (nm) | $SiO_2$ Particles (wt. %) |
|---|---|---|---|---|---|
| 3A | 0 | 200 | 0.7 | 350 | 0 |
| 3B | 0.5 | 200 | 0.7 | 350 | 0 |
| 3C | 0 | 200 | 0.7 | 350 | 2 |
| 3D | 0.5 | 200 | 0.7 | 350 | 2 |
| 3E | 0 | 200 | 0.7 | 500 | 0 |
| 3F | 0.5 | 200 | 0.7 | 500 | 0 |
| 3G | 0 | 200 | 0.7 | 500 | 2 |
| 3H | 0.5 | 200 | 0.7 | 500 | 2 |

TABLE 3B

| Polishing Composition | Ni-P RR (mg/min) | Microwaviness (Å) | Short Microwaviness (Å) | LF-Ra (Å) | Roll Off (Å) |
|---|---|---|---|---|---|
| 3A | 47.0 | 3.75 | 3.96 | 4.84 | −513 |
| 3B | 39.8 | 4.22 | 4.22 | 5.15 | −624 |
| 3C | 51.9 | 3.04 | 2.80 | 3.39 | −1209 |
| 3D | 44.5 | 3.04 | 2.79 | 3.36 | −950 |
| 3E | 57.6 | 3.98 | 4.25 | 5.43 | −689 |
| 3F | 48.6 | 4.37 | 4.54 | 5.75 | −1364 |
| 3G | 66.1 | 3.56 | 3.56 | 4.46 | −706 |
| 3H | 57.9 | 3.49 | 3.53 | 4.47 | −939 |

Polishing Compositions 3A-3D are similar to Polishing Compositions 3E-3H, respectively, except that Polishing Compositions 3A-3D utilize second alpha alumina particles with an average particle size of 350 nm, whereas Polishing Compositions 3E-3H utilize second alpha alumina particles with an average particle size of 500 nm. Within each group of Polishing Compositions 3A-3D and Polishing Compositions 3E-3H, one polishing composition only utilizes second alpha alumina particles and fumed alumina particles as the abrasive (Polishing Compositions 3A and 3E), one polishing composition only utilizes first and second alpha alumina particles and fumed alumina particles as the abrasive (Polishing Compositions 3B and 3F), one polishing composition only utilizes second alpha alumina particles, fumed alumina particles, and wet-process silica particles as the abrasive (Polishing Compositions 3C and 3G), and one polishing composition utilizes first and second alpha alumina particles, fumed alumina particles, and wet-process silica particles as the abrasive (Polishing Compositions 3D and 3H).

As apparent from the data set forth in Table 3B, higher removal rates are obtained, but with an increase in microwaviness, short microwaviness, and low frequency roughness, when the abrasive comprises a second alpha alumina particles having an average particle size of 500 nm, in contrast to the abrasive comprising a second alpha alumina particles having an average particle size of 350 nm (compare Polishing Compositions 3A and 3E, Polishing Compositions 3B and 3F, Polishing Compositions 3C and 3G, and Polishing Compositions 3D and 3H).

When the abrasive comprises first alpha alumina particles, second alpha alumina particles, fumed alumina particles, and wet-process silica particles, acceptable removal rates are obtained along with acceptable microwaviness, short microwaviness, and low frequency roughness characteristics for the resulting substrates. For example, Polishing Composition 3D exhibited a balance of an acceptable removal rate and polished substrate surface properties, as compared to Polishing Compositions 3A-3C. Similarly, Polishing Composition 3H exhibited a balance of an acceptable removal rate and polished substrate surface properties, as compared to Polishing Compositions 3E-3G.

Example 4

Polishing Compositions 4A-4H were prepared with 0.1 wt. % first alpha alumina particles having an average aspect ratio of 1-1.1 and an average particle size of 200 nm, 0.86 wt. % second alpha alumina particles having an average aspect ratio of 2-2.7 and an average particle size of 500 nm, 1.65 wt. % wet-process silica particles having a surface area as indicated in Table 4, 0.24 wt. % fumed alumina particles, 0.108 wt. % organo siloxane (Silwet L7200), 1 wt. % chelating agent, and 2.1 wt. % oxidizing agent as indicated in Table 4.

The polishing compositions were used to polish nickel-phosphorous substrates under similar conditions. The resulting nickel-phosphorous substrates were evaluated for embedded alumina particles (OSA count) post-polishing and are set forth in Table 4.

TABLE 4

| Polishing Composition | Surface Area of SiO$_2$ Particles (m$^2$/g) | Chelating Agent | Oxidizing Agent | Post-Polishing Defect Count |
|---|---|---|---|---|
| 4A | 80 | Glycine | H$_2$O$_2$ | 134 |
| 4B | 80 | Glycine | Na$_2$S$_2$O$_8$ | 223 |
| 4C | 80 | Nicotinic acid | H$_2$O$_2$ | 161 |
| 4D | 80 | Nicotinic acid | Na$_2$S$_2$O$_8$ | 130 |
| 4E | 170 | Glycine | H$_2$O$_2$ | 324 |
| 4F | 170 | Glvcine | Na$_2$S$_2$O$_8$ | 374 |
| 4G | 170 | Nicotinic acid | H$_2$O$_2$ | 236 |
| 4H | 170 | Nicotinic acid | Na$_2$S$_2$O$_8$ | 290 |

As apparent from the data set forth in Table 4, when the polishing composition comprises wet-process silica particles having a smaller surface area of 80 m$^2$/g (i.e., when the wet-process silica particles are of a larger size), in contrast to a larger surface area of 170 m$^2$/g (i.e., in contrast to wet-process silica particles of a smaller size), a lower defect count is observed, indicating less embedded alumina particles in the substrate after polishing. In particular, Polishing Compositions 4A-4D (comprising silica having a surface area of 80 m$^2$/g) had post-polishing defect counts that were significantly lower than the post-polishing defect counts of otherwise identical Polishing Compositions 4E-4H (comprising silica having a surface area of 170 m$^2$/g), respectively.

In addition, the use of nicotinic acid as the chelating agent in the polishing compositions typically resulted in lower post-polishing defect counts than when glycine was used as the chelating agent. For example, Polishing Compositions 4D, 4G, and 4H (comprising nicotinic acid as the chelating agent) resulted in post-polishing defect counts of 130, 236, and 290, respectively, which are lower than the post-polishing defect counts of 223, 324, and 374 resulting from the use of Polishing Compositions 4B, 4E, and 4F (comprising glycine as the chelating agent), respectively. However, Polishing Composition 4A (comprising hydrogen peroxide and glycine) exhibited a lower post-polishing defect count of 134 than Polishing Composition 4C (comprising hydrogen peroxide and nicotinic acid), which exhibited a post-polishing defect count of 161.

As also apparent from the data in Table 4, the use of hydrogen peroxide as the oxidizing agent in the polishing compositions typically resulted in lower post-polishing defects than when sodium persulfate was used as the oxidizing agent. For example, Polishing Compositions 4A, 4E, and 4G (comprising hydrogen peroxide as the oxidizing agent) resulted in post-polishing defect counts of 134, 324, and 236, respectively. In contrast, Polishing Compositions 4B, 4F, and 4H (comprising sodium persulfate as the oxidizing agent) resulted in post-polishing defect counts of 223, 374, and 290, respectively. However, Polishing Composition 4C (comprising nicotinic acid in combination with hydrogen peroxide) resulted in a higher post-polishing defect count of 161, in contrast to Polishing Composition 4D (comprising nicotinic acid and sodium persulfate) which resulted in a post-polishing defect count of 130.

Example 5

Polishing Compositions 5A-5B were prepared with first alpha alumina particles having an average aspect ratio of 1.1-1:1 and an average particle size of 200 nm, second alpha alumina particles having an average aspect ratio of 2-2.7:1 and an average particle size of 500 nm, fumed alumina, wet-process silica particles, chelating agent, and oxidizing agent in the type and amounts indicated in Table 5.

The polishing compositions were used to polish nickel-phosphorous substrates under similar conditions. The removal rates (RR) of the nickel-phosphorous substrate were determined and are set forth in Table 5. In addition, the resulting nickel-phosphorous substrates were evaluated for microwaviness and the results are set forth in Table 5.

TABLE 5

| Polishing Composition | First Alpha Alumina Particles (wt. %) | Second Alpha Alumina Particles (wt. %) | Fumed Alumina Particles (wt %) | Silica Particles (wt. %) | Chelating Agent | Oxidizing Agent | Ni-P RR (mg/min) | Micro-waviness (Å) |
|---|---|---|---|---|---|---|---|---|
| 5A | 0.10 | 0.86 | 0.24 | 1.65 | 1 wt. % Glycine | 2.1 wt. % $Na_2S_2O_8$ | 49.0 | 4.0 |
| 5B | 0.05 | 1.35 | 0.40 | 1.0 | 2 wt. % Tartaric Acid | 0.6 wt. % $H_2O_2$ | 67.0 | 4.5 |

As apparent from the data set forth in Table 5, the inventive composition produced acceptable microwaviness results while also having a high removal rate for Ni—P.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polishing composition comprising:
   (a) an abrasive comprising:
      (i) first alpha alumina particles, wherein the first alpha alumina particles have an average aspect ratio of 0.8:1 to 1.2:1,
      (ii) second alpha alumina particles, wherein the second alpha alumina particles have an average aspect ratio of greater than 1.2:1,
      (iii) fumed alumina particles,
      (iv) wet-process silica particles, and
   (b) water.

2. The composition of claim 1, wherein the second alpha alumina particles have an average aspect ratio of 1.3:1 to 5:1.

3. The composition of claim 1, wherein the weight ratio of the first alpha alumina particles to the second alpha alumina particles is 0.1:1 to 1:1.

4. The composition of claim 1, wherein the abrasive comprises (i) 1 to 10 wt. % of the first alpha alumina particles, (ii) 20 to 60 wt. % of the second alpha alumina particles, (iii) 5 to 20 wt. % of fumed alumina particles, and (iv) 20 to 60 wt. % of wet-process silica particles, based on the total weight of the abrasive in the polishing composition.

5. The composition of claim 1, wherein the composition comprises 1 wt. % to 10 wt. % of the abrasive.

6. The composition of claim 1, wherein the composition further comprises an oxidizing agent.

7. The composition of claim 1, wherein the composition further comprises a chelating agent for nickel.

8. The composition of claim 1, wherein the composition further comprises a nonionic surfactant.

9. The composition of claim 1, wherein the first alpha alumina particles have an average particle size of 200 nm to 600 nm, and the second alpha alumina particles have an average particle size of 100 nm to 600 nm.

10. The composition of claim 1, wherein the composition has a pH of 1 to 4.

11. A method of polishing a substrate, which method comprises:
   (i) providing a substrate,
   (ii) providing a polishing pad,
   (iii) providing a polishing composition comprising:
      (a) an abrasive comprising:
         (A) first alpha alumina particles, wherein the first alpha alumina particles have an average aspect ratio of 0.81:1 to 1.2:1,
         (B) a second alpha alumina particles, wherein the second alpha alumina particles have an average aspect ratio of greater than 1:2,
         (C) fumed alumina particles,
         (D) wet-process silica particles, and
      (b) water,
   (iv) contacting a surface of the substrate with the polishing pad and the polishing composition, and
   (v) abrading at least a portion of the surface of the substrate to remove at least some portion of the substrate and to polish the surface of the substrate.

12. The method of claim 11, wherein the second alpha alumina particles have an average aspect ratio of 1.3:1 to 5:1.

13. The method of claim 11, wherein the weight ratio of the first alpha alumina particles to the second alpha alumina particles is 0.1:1 to 1:1.

14. The method of claim 11, wherein the abrasive comprises (i) 1 to 10 wt. % of the first alpha alumina particles, (ii) 20 to 60 wt. % of the second alpha alumina panicles, (iii) 5 to 20 wt .% of fumed alumina particles, and (iv) 20 to 60 wt. % of wet-process silica panicles, based on the total weight of the abrasive in the polishing composition.

15. The method of claim 11, wherein the composition comprises 1 wt. % to 10 wt. % of the abrasive.

16. The method of claim 11, wherein the composition further comprises an oxidizing agent.

17. The method of claim 11, wherein the composition further comprises a chelating agent for nickel.

18. The method of claim 11, wherein the composition further comprises a nonionic surfactant.

19. The method of claim 11, wherein the first alpha alumina particles have an average particle size of 200 nm to 600 nm, and the second alpha alumina particles have an average particle size of 100 nm to 600 nm.

20. The method of claim 11, wherein the composition has a pH of 1 to 4.

21. The method of claim 11, wherein the substrate comprises at least one layer of nickel-phosphorous, and at least some nickel-phosphorous is removed from the surface of the substrate to polish the surface of the substrate.

22. The method of claim 21, wherein the substrate is a nickel-phosphorous coated aluminum memory disk.

\* \* \* \* \*